Sept. 26, 1967
R. C. BAKER
3,343,399
ABRASION TESTER
Filed May 3, 1965
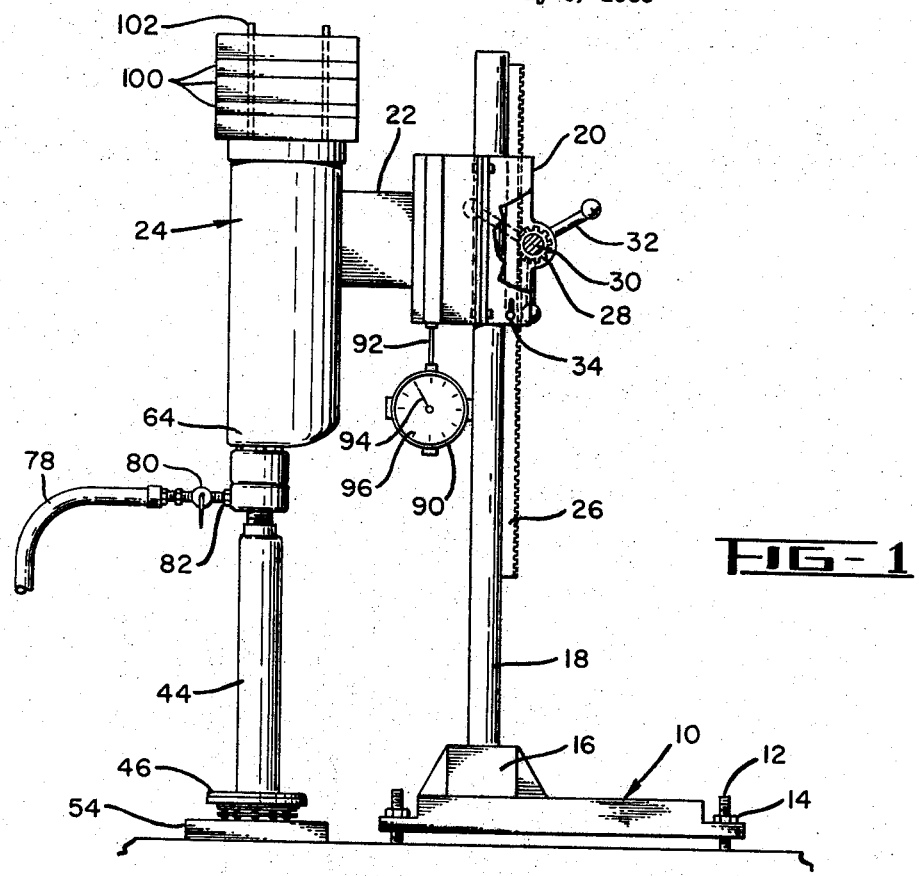
FIG-1
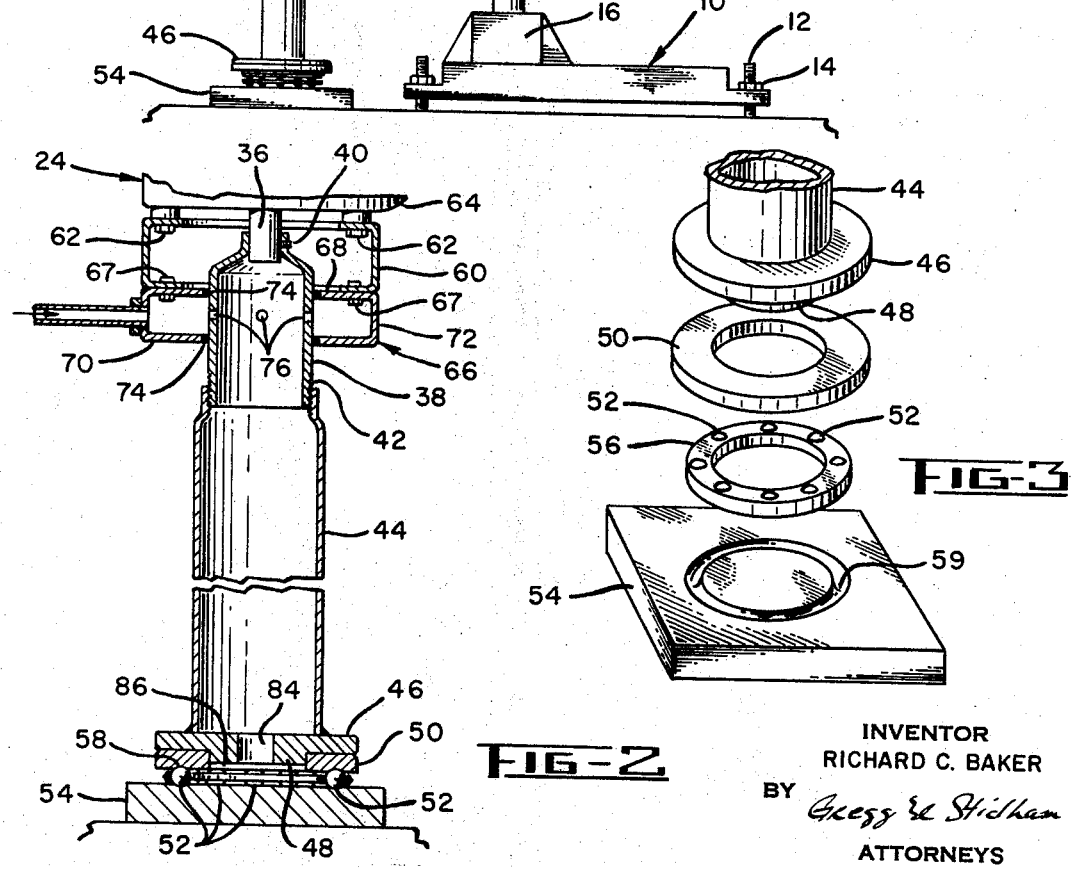
FIG-2
FIG-3
INVENTOR
RICHARD C. BAKER
BY Gregg & Stickham
ATTORNEYS United States Patent Office 3,343,399
Patented Sept. 26, 1967

3,343,399
ABRASION TESTER
Richard C. Baker, 278 E. Blythedale,
Mill Valley, Calif. 94941
Filed May 3, 1965, Ser. No. 452,684
7 Claims. (Cl. 73—7)

ABSTRACT OF THE DISCLOSURE

An abrasion testing apparatus for measuring the wear qualities of a test material comprising a base with a post extending upwardly therefrom. A drive motor is supported on the post, which motor is provided with a downwardly extending shaft. A bearing plate is attached to the lower end of the shaft, which plate rests upon a plurality of rolling abrading elements in engagement with the surface of the material under test. The abrading elements are carried in a retaining ring which ring, together with the attached abrading elements, is removable from the test material when the bearing plate is raised. The base may rest upon a floor, and the floor itself may comprise the material to be tested.

---

This invention relates to a testing apparatus and more particularly to an apparatus for testing the wear resistance of materials.

Numerous arrangements for determining the wearing qualities of solid materials are known. Generally such arrangements include a tool in contact with the material being tested and movable relatively therewith. The loading and speed of the tool, time duration of the test, and depth to which the tool wears away the material are all factors in determining the wearing qualities of the material. Obviously, the tool for producing the wear is itself subject to wear. With many prior art testing devices the wear producing characters of the tool change with wear and the tool must be replaced, resharpened or the like, if the tests are to be meaningful and reproducible. For example, some testing tools comprise cutting bits which become dull with use and it will be apparent that a dull bit will generally produce less wear than a sharp bit, all other test factors being equal. Also, if the tool becomes dull during any single test, it will be apparent that the test results will be adversely affected.

An object of this invention is the provision of a wear testing tool in which the wearing characteristics of the tool on the material being tested remain substantially the same as the tool itself wears.

An object of this invention is the provision of a wear testing device which depends upon high contact stress between rolling abrading elements and the material being tested for abrading the material and providing a measure of the wearing qualities of said material.

An object of this invention is the provision of an abrasion testing device which includes means for directing fluid across the surface of the material being tested to remove abraded material therefrom.

These and other objects and advantages of the invention are achieved by use of rolling abrading members which are rolled along a path on the surface of the material being tested. Preferably, the abrading members are spherical in shape and under loading high contact stresses between the spheres and the material being tested are developed to abrade or wear away the material. It has been found that the rolling members remain substantially spherical as they wear and that the abrading or wear characteristics of the tool thereby remain substantially constant with tool wear.

Any suitable testing apparatus may be employed for driving the rolling abrading members and applying pressure thereto. The novel testing apparatus of this invention includes a base member which is adapted to be supported on a generally flat surface such as floor. A column or post extends upwardly from the base along which a sleeve member is slidably supported. A rotary drive means such as an electric motor is carried by the sleeve member, and a tubular drive shaft is coupled to the motor shaft and extends downwardly therefrom. A bearing plate carried at the lower end of the drive shaft is adapted to engage the abrading members to drive the same upon rotation by the motor. Bearing load on the abrading members is supplied by the weight of the motor which is free to slide along the upright post through the sleeve connection. Additional weights may be added for testing of materials having greater hardness and wear qualities.

As the abrading members are rolled over the material to be tested, the material is abraded as a result of the high contact stress between the weighted rolling abrading members and the material being tested. If desired, the abraded material may be removed by supplying fluid under pressure to the tubular drive shaft, which fluid flows down the shaft and radially outwardly between the abrading members over the test material to carry away the material abraded therefrom. The apparatus is readily adapted for testing specimens of material or it may be employed directly on the material in situ.

In the drawings wherein like reference characters refer to the same parts in the several views:

FIGURE 1 is a side elevational view of an abrasion testing apparatus embodying this invention, FIGURE 2 is an enlarged vertical sectional view through the tool and drive shaft, and FIGURE 3 is an enlarged exploded perspective view showing the tool and a test specimen upon which a test has been performed.

Reference is now made to FIGURE 1 of the drawings wherein there is shown a base 10 which is provided with threaded legs 12 adjacent the four corners thereof. The legs engage tapped holes through the base and may be locked in position by locking nuts 14. When the nuts 14 are loosened, the legs may be adjusted by rotating the same to level the apparatus.

A socket 16 is formed on the base for the vertical upright support of a post or column member 18. A two-part sleeve 20 is slidably mounted on the post and carries a bracket 22 to which an electric motor 24 or other suitable rotary drive means is attached. For convenience, a rack and pinion arrangement may be included for manually raising and lowering the motor. As seen in FIGURE 1, a rack 26 is provided on the post 18 and a pinion gear 28 in engagement with the rack is shown fixed to a shaft 30 which is rotatably mounted on the sleeve 20. A handle 32 comprising three extending arms symmetrically spaced is attached to the shaft 30 by means not shown, for rotation of the shaft and attached pinion gear to actuate the sleeve along the post. A locking device 34 in the form of a bolt threadedly engaged in the sleeve may be provided for locking the sleeve in the raised position. The end of the locking bolt 34 engages the rack 26 to lock the sleeve on the post when the bolt is tightened. As will become apparent in the description of the operation of the apparatus hereinbelow, the locking device 34 is normally in an unlatched position and the handle 32 is released to permit the sleeve 20 to slide down the post under the force of gravity.

As seen in FIGURE 2, the motor shaft 36 is provided with a chuck 38 which is fastened thereto by any suitable means such as a set screw 40. The illustrated chuck is in the form of a cylindrical sleeve which is threaded at the lower end as at 42 for attachment of a tubular drive shaft 44 thereto. An annular mounting flange 46 is welded or otherwise suitably secured to the bottom or lower end of the drive shaft, and is formed with a downwardly depending mounting hub 48 for removable attachment of an annular bearing or load plate 50 thereto. The bearing plate is formed with an inside diameter which snugly fits over the flange or hub with the top of the bearing plate abutting the bottom of the flange.

In accordance with this invention, the bearing or load plate 50 bears upon and applies a load to rolling abrading elements 52 which are positioned on the surface of the material to be tested. In the illustrated arrangement the abrading elements are shown resting on a test specimen 54. If the floor itself is to be tested, the abrading elements would, of course, be positioned directly on the floor at the location to be tested. As seen in FIGURES 2 and 3 the rolling abrading elements comprise hardened spheres or balls loosely held in a circle by a ball retaining ring 56. An annular arcuate shaped groove 58 (see FIGURE 2) is formed in the bottom of the bearing plate and provides a seat for the balls 52. The balls 52, retainer ring 56 and bearing plate 50 may be of the type employed in a conventional ball thrust bearing with the abrading members 52 comprising the ball bearings the retainer ring 56 the ball cage, and the bearing plate 50 one race of the thrust bearing.

With the motor 24 energized, the balls are rolled around in a circular path on the material to be tested to abrade the specimen 54 and to wear a circular groove 59 therein (see FIGURE 3). The abraded material is pulverized by the action of the balls and in some instances could effect the test results if left in the groove 59 worn by the balls. The novel test apparatus of this invention includes means for passing a fluid over the surface being tested to carry the abraded material away from the test tool. As seen in FIGURE 2, a bracket 60 is attached by bolts 62 to the bottom of the motor housing 64, and supports a plenum chamber or jacket 66 by fastening means 67. The chamber or jacket comprises spaced top and bottom walls 68 and 70, respectively, with an interconnecting side wall 72. Axially aligned holes are formed in the top and bottom walls of the chamber through which the chuck 38 extends, and seal rings 74 at the edges of the holes engage the chuck wall to provide a fluid tight connection therebetween. Holes 76 are formed in the chuck for communication between the chamber 66 and the inside of the chuck.

Fluid under pressure from a source not shown is supplied through a hose 78, manually operated valve 80 and fitting 82 to the plenum chamber or jacket 66. From the chamber the fluid passes through the holes 76, down through the chuck and tubular drive shaft, through the openings 84 and 86 in the mounting flange 46 and bearing plate 50, respectively, and thence radially outwardly past the abrading members 52 and retaining ring 56 over the test specimen 54 to the surrounding area. The fluid passes over the groove 59 in the specimen to carry away abraded material removed therefrom. Fluid in the form of either a gas or a liquid may be employed. In addition to removing abraded material, the passage of fluid may also serve to cool the test specimen and prevent a breakdown thereof due to excessive heat generated by the abrading process. Suitable fluid to function as a lubricant or as a cutting material, as desired could be employed.

In order to measure the depth of the circular path 59 worn in the test specimen, a dial gauge 90 of conventional design may be employed, which gauge is secured to the post 18 by a suitable means not shown. The actuating arm 92 of the gauge is resiliently biased in an outward direction from the gauge with the outer free end of said arm in abutting relation with the sleeve 20 for actuation of the gauge as the sleeve slides along the post. Axial movement of the arm rotates a pointer 92 over a dial 96 calibrated in terms of distance such as inches. Such dial gauges are well known and require no further description.

In the operation of the apparatus the platform or base 10 is first leveled by means of the adjustable legs 12 to vertically position the drive shaft 44. The tool is raised off the specimen or floor by rotating the handle 32 and locking the sleeve in a raised position by the locking bolt 34. If the test is to be made on the floor, the ball retaining ring 56 with the balls 52 therein is placed on the floor directly beneath the drive shaft. If the test is to be conducted on a test specimen as shown, the specimen is placed on the floor beneath the ball retaining ring. With either test the locking bolt 34 is loosened and the bearing plate 50 carried by the flange 46 is lowered onto the balls with the balls positioned in the groove 58 in said bearing plate. An initial reading of the dial gauge 90 is then made. The test is started by energizing the motor 24 to rotate the balls under pressure supplied by the weight of the apparatus slidable along the post. The balls are rotated for an interval of time, say ten minutes, during which the dial gauge is read at one minute intervals. The difference in readings, of course, is a measure of the depth of wear in the material being tested. The depth of wear may be plotted versus time for each reading and a curve faired through these points. By taking readings at periodic intervals, changes in the wear resistance of the specimen with depth beneath the surface are thus detected. For materials having a high resistance to abrasion, weights 100 (see FIGURE 1) may be added to the top of the motor to increase the load on the rolling balls 52. To keep the weights in place on the motor, upright rods 102 may be included which extend through holes, not shown in the weights. During the test fluid may be supplied to the plenum chamber of jacket 66 for passage over the test material in the manner described above.

Due to the high contact stress between the rolling balls 52 and the surface of the material being tested, the material is rapidly abraded and tests may be completed on many materials in about 10 to 15 minutes. Prior art testing apparatus often requires hours of testing.

The wear on the rolling abrading balls during any single test is generally so small as to be negligible. The balls do, of course, wear with use and must occasionally be replaced. However, it has been found that they remain substantially spherical as they are reduced in size due to wear. Further, it has been found that substantially the same test results are obtained for any given test material regardless of the diameter of the abrading members within the range of wear of said members. That is, substantially the same test results are obtained for a test run on a material using new full size abrading elements as when the test is repeated after the abrading elements have worn to a reduced diameter. As a practical matter, the abrading elements may be used until they have become small enough to fall out of the retaining ring 56. This occurs with a ±20% reduction in the ball diameter.

The invention having been described in detail in accordance with the requirement of the patent statutes various changes and modifications may suggest themselves to those skilled in this art without departing from the spirit and scope of the invention as defined by the claims appended hereto.

I claim:

1. An abrasion testing apparatus for measuring the wear qualities of a test material with a generally flat horizontal surface, said apparatus comprising a row of rolling abrading elements arranged in a circle and adapted to engage the surface of the test material, a retainer ring for maintaining said abrading elements in a circle, a rotary load plate positioned on said abrading elements, a drive shaft attached to said load plate and extending upwardly therefrom, means for rotating said drive shaft, means for applying a load on said elements through said load plate to provide a high contact stress between said abrading elements and the surface of the test material, and means for raising the drive shaft and attached load plate to remove the load plate from the abrading elements, said abrading elements and retaining ring comprising a separate unit which is removable from the test material when the load plate is raised.

2. The apparatus as defined in claim 1 wherein said load plate has a generally flat bottom surface formed with an annular groove within which the abrading elements are received when the load plate is in the lowered position.

3. An abrasion testing apparatus comprising a base member adapted for support on a generally flat surface, a post extending upwardly from said base member, a sleeve slidable along said post, a rotary drive means supported by said sleeve, a drive shaft extending downwardly from said drive means for rotation thereby, a bearing plate carried at the lower end of said drive shaft, a plurality of rolling abrading elements arranged in a circle and adapted to engage the surface of the material under test, said bearing plate resting on said rolling abrading elements and supplying a loading force thereto, said rolling abrading elements being driven in a circular path by said bearing plate, and means for measuring the depth of material abraded by said rolling abrading elements.

4. The abrasion testing apparatus recited in claim 3 wherein said drive shaft is tubular, and said apparatus includes means for passing fluid under pressure through said drive shaft and generally radially outwardly past the rolling abrading elements to remove abraded materials from around said elements.

5. An abrasion testing apparatus comprising a base member adapted for support on a generally flat surface, a post extending upwardly from said base member, a sleeve slidable along said post, a rotary drive means supported by said sleeve, a drive shaft extending downwardly from said drive means for rotation thereby, a bearing plate carried at the lower end of said drive shaft, and a plurality of rolling abrading elements arranged in a circle and adapted to engage the surface of the material under test, said bearing plate resting on said rolling abrading elements and supplying a loading force thereto, said rolling abrading elements being driven in a circular path by said bearing plate.

6. An abrasion testing apparatus for measuring the wear qualities of a test material comprising:
a base member adapted for support on a generally flat surface,
a post extending upwardly from said base member,
a rotary drive means,
means for supporting the rotary drive means on the post,
a drive shaft extending downwardly from said drive means for rotation thereby,
a load plate attached to the lower end of the drive shaft,
rolling abrading elements arranged in a circle and adapted to engage the surface of the test material,
a retainer ring for maintaining said abrading elements in a circle,
means for applying a load on the rolling abrading elements through the load plate during drive rotation thereof, and
means for raising the load plate from the abrading elements,
said abrading elements and retaining ring comprising a separate unit which is removable from the test material when the load plate is raised.

7. The abrasion testing apparatus as defined in claim 6 wherein the base member is adapted for support on a generall flat floor surface, and
the test material comprises a portion of the floor.

References Cited
UNITED STATES PATENTS

| | | | |
|---|---|---|---|
| 2,016,779 | 10/1935 | Hardgrove | 73—7 |
| 3,065,627 | 11/1962 | Ross | 73—7 |
| 3,069,892 | 12/1962 | Gjertsen | 73—7 |

FOREIGN PATENTS 413,471  5/1925  Germany.

DAVID SCHONBERG, *Primary Examiner.*